(12) United States Patent
Qian et al.

(10) Patent No.: US 10,586,415 B2
(45) Date of Patent: Mar. 10, 2020

(54) AUTHORIZATION METHOD, APPARATUS, AND SYSTEM APPLIED TO ELECTRONIC LOCK

(71) Applicant: Tencent Technology (Shenzhen) Company Limited, Shenzhen (CN)

(72) Inventors: Kai Qian, Shenzhen (CN); Chenbin Fu, Shenzhen (CN); Xin Yang, Shenzhen (CN); Ye Fang, Shenzhen (CN); Chaohui Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/030,745

(22) Filed: Jul. 9, 2018

(65) Prior Publication Data

US 2018/0322718 A1 Nov. 8, 2018

Related U.S. Application Data

(63) Continuation-in-part of application No. PCT/CN2017/073960, filed on Feb. 17, 2017.

(30) Foreign Application Priority Data

Feb. 17, 2016 (CN) .......................... 2016 1 0089412

(51) Int. Cl.
*G07C 9/00* (2020.01)
*H04L 12/58* (2006.01)
*G07C 9/27* (2020.01)

(52) U.S. Cl.
CPC ................. *G07C 9/27* (2020.01); *G07C 9/00* (2013.01); *G07C 9/00309* (2013.01);
(Continued)

(58) Field of Classification Search
CPC .. G07C 9/00103; G07C 9/00; G07C 9/00309; G07C 9/00563; G07C 9/00571;
(Continued)

(56) References Cited

U.S. PATENT DOCUMENTS 8,943,187 B1 * 1/2015 Saylor ................ G06F 21/6209
709/223
9,189,904 B1 11/2015 Diorio et al.
(Continued)

FOREIGN PATENT DOCUMENTS

CN 103546294 A 1/2014
CN 103903319 A 7/2014
(Continued)

OTHER PUBLICATIONS

Tencent Technology, ISRWO, PCT/CN2017/073960, Jun. 1, 2017, 7 pgs.
(Continued)

*Primary Examiner* — Edwin C Holloway, III
(74) *Attorney, Agent, or Firm* — Morgan, Lewis & Bockius LLP

(57) ABSTRACT

Embodiments of the present disclosure disclose an authorization method and an apparatus applied to an electronic lock. The method performed at a server hosting an instant messaging application includes: receiving an authorization request sent by a first instant messaging client at a first terminal, and the authorization request being used for requesting to grant use permission on the electronic lock to a second account; querying for, according to the authorization request, key information bound to the second account; and sending the key information to the electronic lock, the electronic lock being configured to add the key information into a trusted key information store. Moreover, the instant messaging application at the server can also be involved to
(Continued)

further enhancing the authenticity of a person who tries to unlock the electronic lock based on the location of a terminal used by the person for accessing the instant messaging application.

16 Claims, 13 Drawing Sheets

(52) U.S. Cl.
CPC ..... *G07C 9/00563* (2013.01); *G07C 9/00571* (2013.01); *H04L 51/04* (2013.01); *H04L 51/18* (2013.01); *G07C 2009/00428* (2013.01); *G07C 2209/08* (2013.01)

(58) Field of Classification Search
CPC ...... G07C 2009/00428; G07C 2209/08; H04L 51/18; H04L 51/04
USPC ........................................................ 340/5.28
See application file for complete search history.

(56) References Cited

U.S. PATENT DOCUMENTS

| | | | | |
|---|---|---|---|---|
| 2002/0178385 | A1* | 11/2002 | Dent | G07C 9/00309 726/27 |
| 2003/0078979 | A1* | 4/2003 | Sagi | H04L 29/06 709/206 |
| 2012/0280783 | A1* | 11/2012 | Gerhardt | G07C 9/00309 340/5.6 |
| 2013/0305319 | A1* | 11/2013 | Matthews, III | H04L 63/08 726/4 |
| 2013/0335193 | A1* | 12/2013 | Hanson | H04W 12/06 340/5.61 |
| 2014/0049371 | A1* | 2/2014 | Tung | G07C 9/00007 340/5.61 |
| 2015/0067792 | A1* | 3/2015 | Benoit | H04W 12/04 726/5 |
| 2018/0293827 | A1* | 10/2018 | Vincenti | G07C 9/00309 |
| 2019/0012860 | A1* | 1/2019 | Lee | G07C 9/00817 |

FOREIGN PATENT DOCUMENTS

| | | |
|---|---|---|
| CN | 104079565 A | 10/2014 |
| CN | 104091376 A | 10/2014 |
| CN | 104135480 A | 11/2014 |
| CN | 104167041 A | 11/2014 |
| CN | 104680630 A | 6/2015 |
| CN | 104809795 A | 7/2015 |
| CN | 105046796 A | 11/2015 |
| CN | 105118127 A | 12/2015 |
| CN | 105227321 A | 1/2016 |
| CN | 105303670 A | 2/2016 |
| WO | WO 2014031399 A1 | 2/2014 |
| WO | WO 2016007877 A1 | 1/2016 |

OTHER PUBLICATIONS

Tencent Technology, IPRP, PCT/CN2017/073960, Aug. 21, 2018, 5 pgs.

* cited by examiner

AUTHORIZATION METHOD, APPARATUS, AND SYSTEM APPLIED TO ELECTRONIC LOCK

RELATED APPLICATIONS

This application is a continuation-in-part application of PCT/CN2017/073960, entitled "AUTHENTICATION METHOD APPLICABLE TO ELECTRONIC LOCK, DEVICE, AND SYSTEM" filed on Feb. 17, 2017, which claims priority to Chinese Patent Application No. 201610089412.6, filed with the State Intellectual Property Office of the People's Republic of China on Feb. 17, 2016, and entitled "AUTHENTICATION METHOD APPLICABLE TO ELECTRONIC LOCK, DEVICE, AND SYSTEM", all of which are incorporated herein by reference in their entirety.

FIELD OF THE TECHNOLOGY

Embodiments of the present disclosure relate to the field of Internet of Things, and in particular, to an authorization method, apparatus, and system applied to an electronic lock.

BACKGROUND OF THE DISCLOSURE

An electronic lock is a novel lock that identifies a user identity based on key information, and opens or closes a lock body according to the user identity. Common electronic locks include a password door lock, a fingerprint door lock, a palm print door lock, and the like.

The fingerprint door lock is used as an example. Before using the fingerprint door lock, a user needs to enroll fingerprint information of the user into the fingerprint door lock, and a manager gives authorization to the user corresponding to the key information. An authorization method provided by the related technology includes: The manager establishes a Bluetooth connection to the fingerprint door lock by using a mobile phone application (APP), and controls, by using the mobile phone APP, the fingerprint door lock to enter a "management mode"; and under the "management mode", the fingerprint door lock obtains, by using a fingerprint collector, a fingerprint enrolled by the user, receives permission allocated by the manager by using the mobile phone APP to the fingerprint information, and associatively stores the fingerprint information and the permission. For example, the permission allocated by the manager to the fingerprint information is: permission to open the fingerprint door lock between 8:00 and 10:00 each day. That is, the user corresponding to the fingerprint information can only open the fingerprint door lock between 8:00 and 10:00 each day.

In the foregoing method, because the user needs to enroll the fingerprint on the fingerprint collector of the fingerprint door lock, when being away from the electronic lock, the user cannot enroll the key information such as the fingerprint into the electronic lock, and the authorization cannot be implemented.

SUMMARY

To resolve a problem that when being away from an electronic lock, a user cannot enroll key information such as a fingerprint into the electronic lock, and authorization cannot be implemented, embodiments of the present disclosure provide an authorization method, apparatus, and system applied to an electronic lock. The technical solutions are as follows:

According to a first aspect of the present disclosure, an authorization method applied to an electronic lock is performed at a computer server having one or more processors and memory storing instructions to be executed by the one or more processors. The method includes:
  receiving an authorization request sent by a first instant messaging client at a first terminal, a first account being logged into the first instant messaging client, and the authorization request being used for requesting to grant use permission on the electronic lock to a second account;
  querying for, according to the authorization request, key information bound to the second account; and
  sending the key information to the electronic lock, the electronic lock being configured to add the key information into a trusted key information store.

According to a second aspect of the present disclosure, a computer server includes one or more processors, memory, and a plurality of instructions stored in the memory that, when executed by the one or more processors, cause the computer server to perform the aforementioned method.

According to a third aspect of the present disclosure, a non-transitory computer readable storage medium storing a plurality of instructions configured for execution by a computer server having one or more processors, the plurality of instructions causing the computer server to perform the aforementioned method.

The technical solutions provided in the embodiments of the present disclosure bring about the following beneficial effects:

The server receives the authorization request sent by the first instant messaging client the first account is logged into, and queries for, according to the authorization request, the key information bound to the second account, so as to send the key information to the electronic lock, and the electronic lock adds the key information into the trusted key information store. The problem that when being away from the electronic lock, the user cannot enroll the key information such as the fingerprint into the electronic lock, and the authorization cannot be implemented is resolved. Even being away from the electronic lock, the user can enroll the key information into the electronic lock from a remote end, and the authorization is ensured to be implemented as normal. Moreover, by forwarding the key information from the electronic lock to the server, additional protection is granted for protecting the electronic lock from unauthorized access.

BRIEF DESCRIPTION OF THE DRAWINGS

To describe the technical solutions of embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

The term "a plurality" mentioned in the specification refers to two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
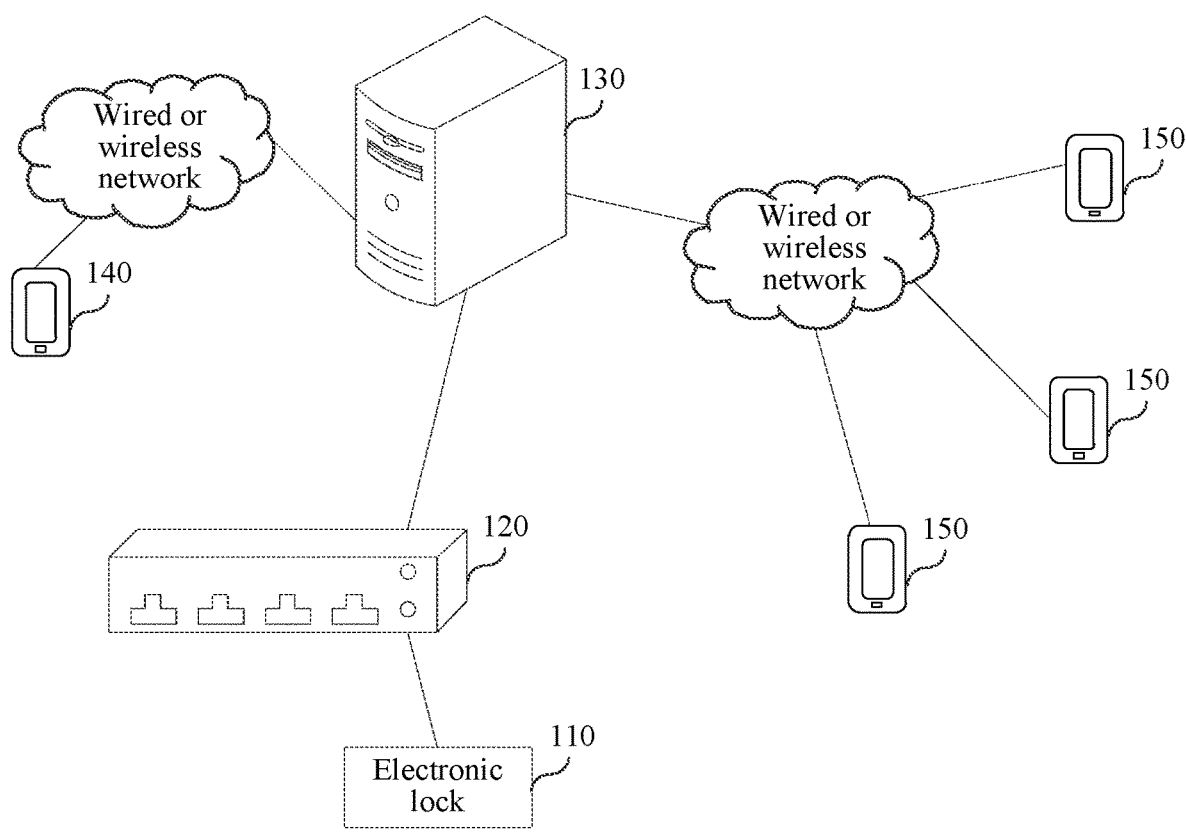
FIG. 1 is a schematic diagram of an implementation environment of an authorization method applied to an electronic lock according to some exemplary embodiments.

Referring to FIG. 1, FIG. 1 is a schematic structural diagram of an implementation environment according to an embodiment of the present disclosure. The implementation environment includes: an electronic lock 110, a gateway device 120, a server 130, a first terminal 140, and a second terminal 150.

The electronic lock 110 is a lock that identifies a user identity based on key information, and opens or closes a lock body according to the user identity. The electronic lock 110 has capabilities of data storage and data transmission. In some embodiments, the electronic lock 110 is a password door lock (using a numeric character password as the key information), a fingerprint door lock (using a fingerprint as the key information), or a palm print door lock (using a palm print as the key information). In some embodiments, the electronic lock 110 further has a capability of timing.

The electronic lock 110 establishes a wired or wireless connection to the gateway device 120. The wireless connection includes a near field low-power wireless connection. For example, the wireless connection is Bluetooth or Zigbee or Wi-Fi.

The gateway device 120 has data transformation and transmission functions. The gateway device 120 provides a data transmission service for the server 130 and the electronic lock 110 by using the data transformation and transmission functions.

The gateway device 120 is connected to the server 130 by using a wired network or a wireless network or both.

The server 130 is a backend server of a third-party application, and the server 130 may be one server or a server cluster or a cloud computing center including a plurality of servers. In this embodiment of the present disclosure, the server 130 stores a binding relationship between the electronic lock 110 and a manager account, and a correspondence between the electronic lock 110 and the gateway device 120. The manager account has management permission on the electronic lock 110.

In some embodiments, the third-party application includes: an instant messaging application, or an application providing a service corresponding to the electronic lock.

The server 130 is connected to the first terminal 140 by using the wired network or the wireless network, and the server 130 is connected to the second terminal 150 by using the wired network or the wireless network.

The first terminal 140 and the second terminal 150 are electronic devices that have data transformation and transmission functions. For example, the electronic device may be a smart phone or a tablet computer. In this embodiment of the present disclosure, instant messaging clients are run on the first terminal 140 and the second terminal 150. A first account is logged into on the instant messaging client that is run on the first terminal 140, and a second account is logged into on the instant messaging client that is run on the second terminal 150. In some embodiments, in the implementation environment, a quantity of the first terminal 140 and a quantity of the second terminal 150 are one or more.

In some embodiments, the wireless network or the wired network uses a standard communications technology and/or protocol. The network is generally Internet, but may also be any network, including but not limited to any combination of a local area network (LAN), a metropolitan area network (MAN), a wide area network (WAN), a mobile, wired or wireless network, a private network, or a virtual private network. In some embodiments, data exchanged by using the network is represented by using a technology and/or format such as a hypertext markup language (HTML), an extensible markup language (XML), or the like. In addition, all or some links may be encrypted by using a conventional encryption technology such as a secure socket layer (SSL), transport layer security (TLS), a virtual private network (VPN), Internet protocol security (IPsec), or the like. In some other embodiments, the data communications technology may be replaced or supplemented by using a custom and/or private data communications technology.

In some embodiments, a first user logs into his/her account of the instant messaging application at the first terminal 140 and a second user logs into his/her account of the instant messaging application at the second terminal 150. The first and second users can exchange messages with each other after a direct-contact relationship is established between the two user accounts by the server 130. In some embodiments, a special user account associated with the electronic lock 110 is established at the instant messaging application like the other user accounts. The user account associated with the electronic lock 110 is managed by the user account associated with the first terminal 140. For example, the user account of the first terminal 140 can determine who can unlock the electronic lock 110 by granting permission to access the user account associated with the electronic lock 110 to one of the second users.

In some embodiments, the electronic lock 110 maintains a set of trusted user accounts and their associated key information provided by the server 130 in its memory. Upon receipt of an entry of key information, the electronic lock 110 checks whether the key information matches any trusted user account's associated key information and then unlocks itself when there is a match.

Figure 2:
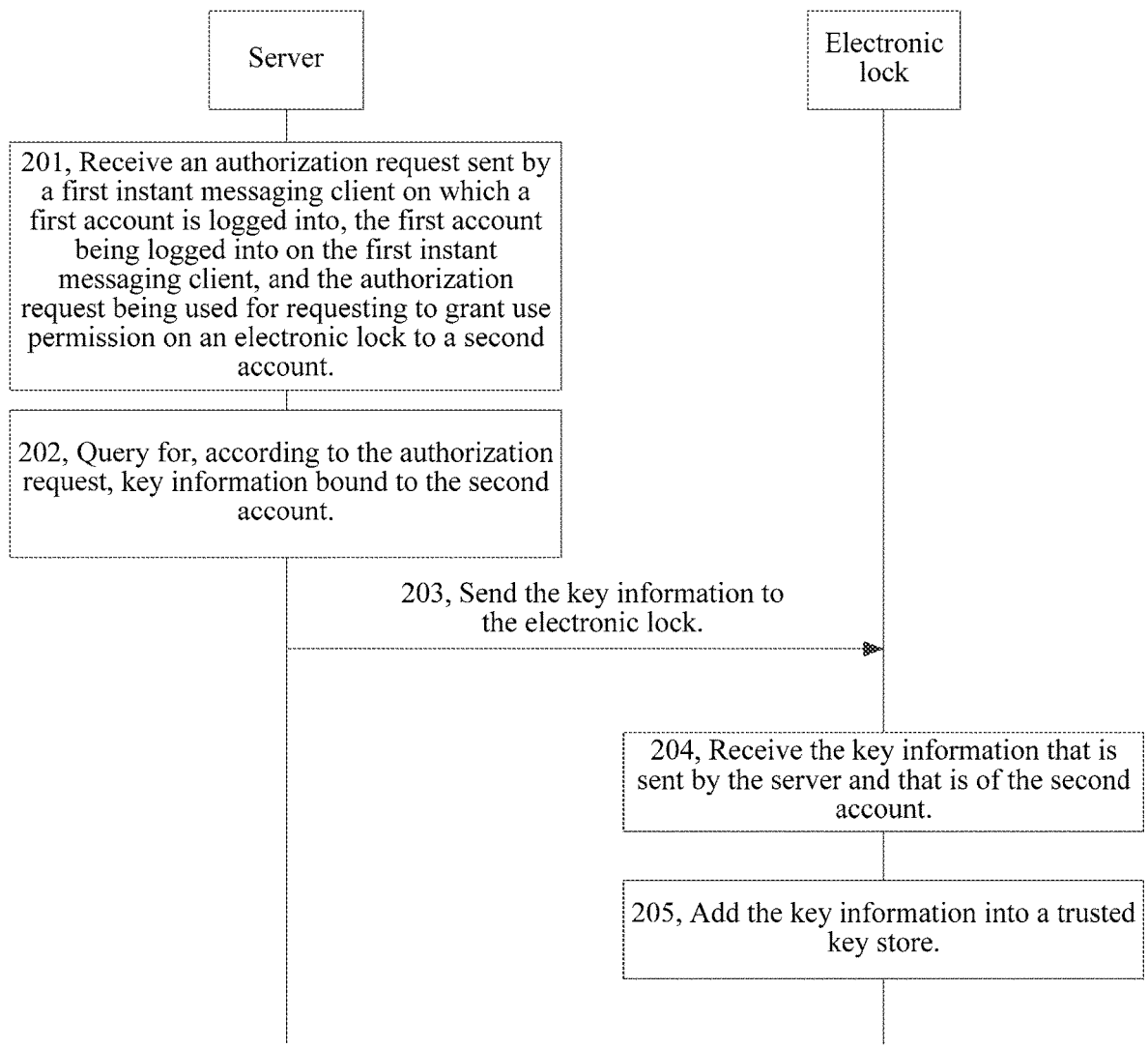
FIG. 2 is a flowchart of an authorization method applied to an electronic lock according to an exemplary embodiment.

Referring to FIG. 2, FIG. 2 is a flowchart of an authorization method applied to an electronic lock according to an exemplary embodiment of the present disclosure. This embodiment is described by using an example in which the authorization method applied to an electronic lock is applied to the implementation environment shown in FIG. 1. The authorization method includes the following steps:

In step S201, a server receives an authorization request sent by a first instant messaging client at a first terminal, a first account being logged into the first instant messaging client, and the authorization request being used for requesting to grant use permission on an electronic lock to a second account.

In some embodiments, the first account is bound to the electronic lock, and has management permission on the electronic lock. That is, the first account is a manager account.

In some embodiments, the second account and the first account are not a same account, a quantity of the second account is one or more, and the second account has a friendship with the first account, or the second account does not have a friendship with the first account.

In step S202, the server queries for, according to the authorization request, key information bound to the second account.

In some embodiments, the key information bound to the second account is pre-collected and stored into the server by the second account.

In some embodiments, the key information includes: password information, and/or fingerprint information, and/or pupil distance information, and/or iris information, and/or face information, and/or palm print information, and/or gait information, and/or heart rate information, and/or pulse information.

In step S203, the server sends the key information to the electronic lock.

In some embodiments, the server queries for a gateway device corresponding to the electronic lock, and sends the key information obtained through query to the electronic lock by using the gateway device.

In step S204, the electronic lock receives the key information that is sent by the server and that is of the second account.

In some embodiments, the electronic lock receives, by using the gateway device, the key information that is sent by the server and that is of the second account.

In step S205, the electronic lock adds the key information into a trusted key information store.

It should be noted that the foregoing step S201 to step S203 may be independently performed to be an authorization method applied to an electronic lock at a server side; and the foregoing step S204 and step S205 may be independently performed to be an authorization method applied to an electronic lock at an electronic lock side.

Based on the above, in the authorization method applied to an electronic lock according to this embodiment of the present disclosure, the server receives the authorization request sent by the first instant messaging client the first account is logged into, and queries for, according to the authorization request, the key information bound to the second account, so as to send the key information to the electronic lock, and the electronic lock adds the key information into the trusted key information store. The problem that when being away from the electronic lock, a user cannot enroll the key information such as a fingerprint into the electronic lock, and authorization cannot be implemented is resolved. Even being away from the electronic lock, the user can enroll the key information into the electronic lock from a remote end, and the authorization is ensured to be implemented as normal.

In some embodiments, the electronic lock 110 may forward a verification request including the key information to the server 130 for determining whether the attempt to unlock the electronic lock 110 should be granted or not. For example, the first user account at the first terminal 140 establishes a special user group within the instant messaging application at the server 130 for the special user account associated with the electronic lock 110. The special user group within the instant messaging application includes one or more user accounts associated with the second terminals 150 that have been granted the permission to unlock the electronic lock 110. In addition to the user account identity information, the special user group also includes key information and permission information that are uniquely assigned to each individual second user associated with a second terminal 150. For example, one second user may be granted a unique passcode for opening the electronic lock 110 for a specific time period and another second user may be granted to open the electronic lock 110 using his/her fingerprint for another specific time period.

The instant messaging application at the server 130 provides an additional security mechanism for preventing unauthorized access to the electronic lock 110. For example, when a second user associated with one the second terminals 150 arrives at a location where the electronic lock 110 is located, the second user then enters the key information through the electronic lock 110. The key information is then submitted to the instant messaging application at the server 130 for verification along the identity information of the electronic lock 110.

Based on the identity information of the electronic lock 110, the instant messaging application at the server 130 identifies a special user group associated with the electronic lock 110 and then checks whether the key information from the electronic lock 110 matches a particular user account in the user group. If there is a match between the key information from the electronic lock 110 and a particular user account in the user group, the server 130 issues an instruction to unlock the electronic lock 110. In some embodiments, besides the key information, the server 130 also checks whether the key information is received within a specific time window assigned to the second user. For example, if the second user is only allowed to unlock electronic lock 110 between 8 AM and 2 PM but the key information is received at 3 PM, the server 130 will deny such access request by not issuing an instruction to unlock the electronic lock 110. In some embodiments, the server 130 also detects the current location of the second terminal 150 associated with the second user who attempts to unlock the electronic lock 110. If the current location of the second terminal 150 is not within a predefined region of the electronic lock 110, the server 130 may still refuse to unlock the electronic lock 110.

Figure 3A:
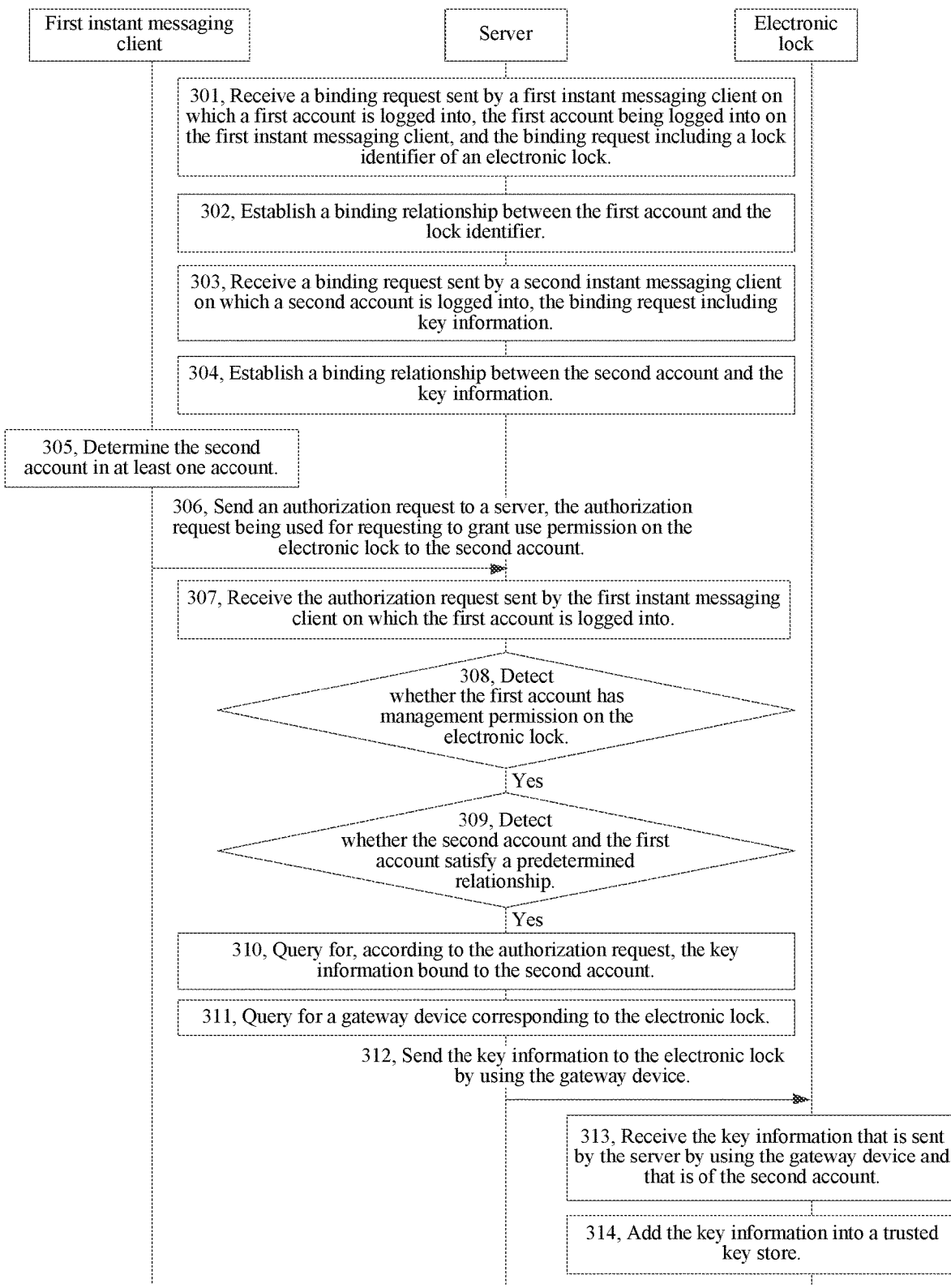
FIG. 3A is a flowchart of an authorization method applied to an electronic lock according to another exemplary embodiment.

Referring to FIG. 3A, FIG. 3A is a flowchart of an authorization method applied to an electronic lock according to another exemplary embodiment of the present disclosure. This embodiment is described by using an example in which the authorization method applied to an electronic lock is applied to the implementation environment shown in FIG. 1. The authorization method includes the following steps:

In step S301, a server receives a binding request sent by a first instant messaging client at a first terminal, a first account being logged into the first instant messaging client, and the binding request including a lock identifier of an electronic lock.

To obtain management permission on the electronic lock, a terminal sends, by using the first instant messaging client the first account is logged into, the binding request that carries the lock identifier, to request the server to bind the first account to the electronic lock and grant the management permission on the electronic lock to the first account.

The first account sends the binding request to the server by using the first instant messaging client, and the binding request sent by the first instant messaging client the first account is logged into is used for binding the first account to the identifier of the electronic lock. In step S302, the server establishes a binding relationship between the first account and the lock identifier.

After the binding relationship with the lock identifier is established, the first account has the management permission on the electronic lock. In some embodiments, the first account is the first account bound to the electronic lock. In some embodiments, there is only one first account.

In step S303, the server receives a binding request sent by a second instant messaging client on which a second account is logged into, the binding request including key information.

A terminal sends, by using the second instant messaging client on which the second account is logged into, the binding request that carries the key information to the server, and the binding request sent by the second instant messaging client on which the second account is logged into is used for requesting the server to bind the key information of the second account to the second account, so that the server subsequently determines the corresponding key information according to the account.

In some embodiments, the key information sent by the second instant messaging client on which the second account is logged into is the key information corresponding to the second account, and the key information is collected by the second instant messaging client on which the second account is logged into. The key information includes: password information, and/or fingerprint information, and/or pupil distance information, and/or iris information, and/or face information, and/or palm print information, and/or gait information, and/or heart rate information, and/or pulse information.

In some embodiments, when the key information is the password information, the key information is a character string entered by a user; when the key information is physiological feature information, the key information is at least one of the fingerprint information, the pupil distance information, the iris information, the face information, the palm print information, the gait information, the heart rate information, or the pulse information collected by the terminal (on which the second instant messaging client is run on); and when the key information is behavioral feature information, the key information is the collected gait information.

In some embodiments, the password information is one or more character strings entered by the user.

It should be noted that except the fingerprint information, the pupil distance information, the iris information, the face information, the palm print information, the gait information, the heart rate information, and the pulse information listed above, other physiological features or behavioral features that can be used for personal identity authentication may also be used as the key information. This is not limited in this embodiment of the present disclosure.

In step S304, the server establishes a binding relationship between the second account and the key information.

In some embodiments, for the sake of safety, after transforming the received key information to feature data by means of specific processing, the server generally establishes and stores the binding relationship between the second account and the feature data of the transformed key information.

It should be noted that step S303 and step S304 may alternatively be performed before step S301. This is not limited in this embodiment.

In step S305, the first instant messaging client the first account is logged into determines the second account in at least one account.

In some embodiments, the first account may determine the second account in all accounts in a contact list, or when the second account is not in the contact list of the first account, the first account may determine the second account by means of searching for an account.

In some embodiments, there is at least one second account.

Figure 3B:
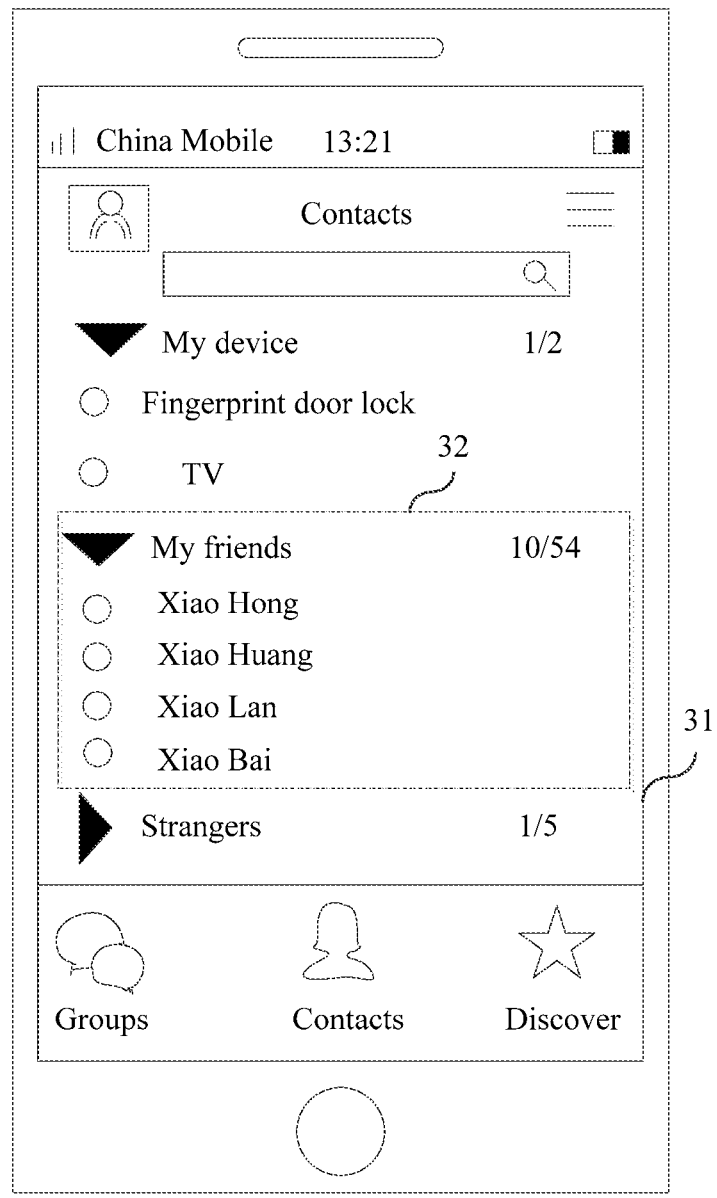
FIG. 3B is a schematic implementation diagram of an authorization method applied to an electronic lock according to another exemplary embodiment.
Figure 3C:
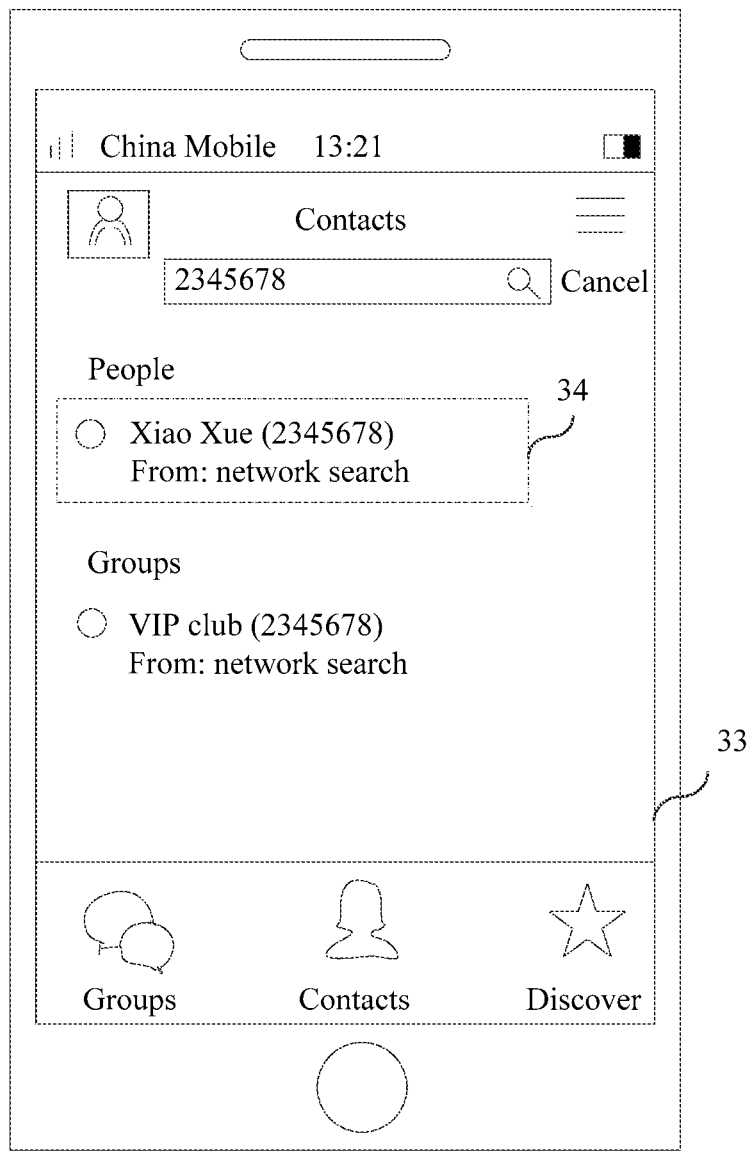
FIG. 3C is a schematic implementation diagram of an authorization method applied to an electronic lock according to another exemplary embodiment.

As shown in FIG. 3B, the first account logged into the first instant messaging client is 123456, and the first instant messaging client determines, according to a selection signal triggered by a user, two second accounts in "my friend" column 32 of a contact interface 31 corresponding to the first account; alternatively, as shown in FIG. 3C, the first account obtains a second account 2345678 that is searched for in a discover interface 33, and determines a personal account "Xiao Xue (2345678)" 34 obtained through search as the second account.

In step S306, the first instant messaging client sends an authorization request to the server, the authorization request being used for requesting to grant use permission on the electronic lock to the second account.

Figure 3D:
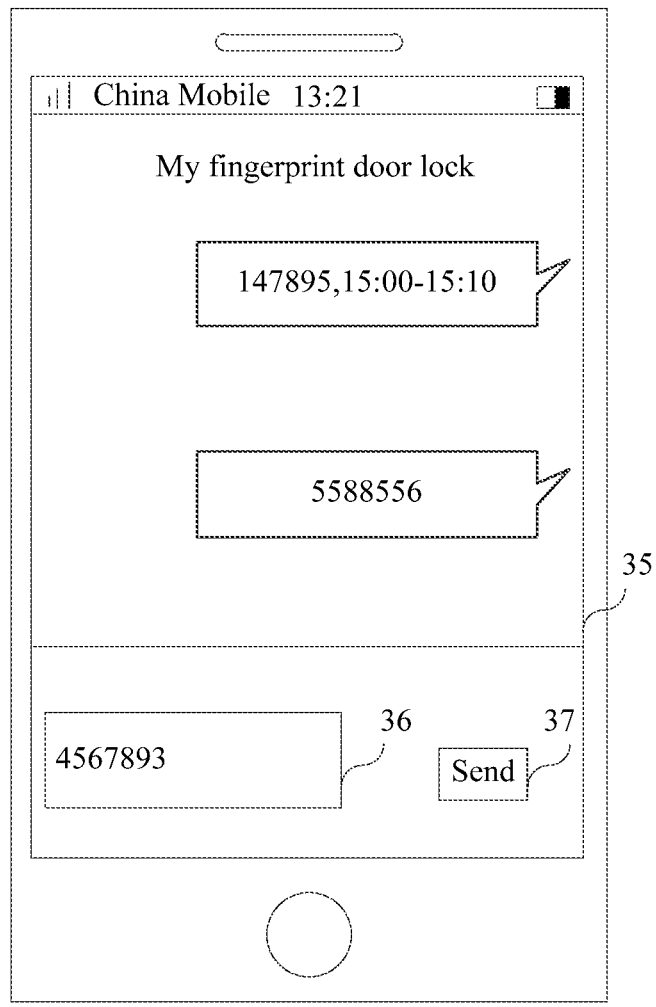
FIG. 3D is a schematic diagram of a message sending interface of instant messaging according to another exemplary embodiment.

In some embodiments, the first instant messaging client the first account is logged into sends the authorization request to the server by means of sending an instant message. As shown in FIG. 3D, a user corresponding to the first account opens, in the first instant messaging client, a conversation window 35 with the electronic lock bound to the first account, enters, in a message input box 36, the second account to which the use permission on the electronic lock is to be granted, and clicks a sending option 37, and then a background of the first instant messaging client automatically generates the authorization request including the second account and sends the authorization request to the server.

In some embodiments, the authorization request includes an identifier of the second account, the lock identifier of the electronic lock corresponding to the first account, and the use permission of the second account on the electronic lock.

In some embodiments, the authorization request further includes a time control policy corresponding to the use permission, the time control policy is used for instructing to enable the use permission in at least one time period, and the time control policy corresponds to the use permission of the second account.

In step S307, the server receives the authorization request sent by the first instant messaging client.

In step S308, the server detects whether the first account has management permission on the electronic lock.

If detecting that the first account has the management permission on the electronic lock, the server performs step S309; and if detecting that the first account does not have the management permission on the electronic lock, the server does not respond to the authorization request sent by the first instant messaging client the first account is logged into.

In some embodiments, the server detects whether the binding relationship between the first account and the lock identifier is stored, and when detecting that the binding relationship between the first account and the lock identifier is stored, determines that the first account has the management permission on the electronic lock.

In step S309, the server detects whether the second account and the first account satisfy a predetermined relationship.

Because a user generally only grants the use permission on the electronic lock to another user that has a specific relationship with the user, to avoid illegal authorization and to improve safety of the authorization, before granting the use permission to the second account, the server needs to further detect whether the second account and the first account satisfy the predetermined relationship.

The predetermined relationship includes at least one of the following relationships:

the second account belongs to a friendship chain of the first account;

a degree of friendship closeness between the second account and the first account is greater than a preset threshold;

a nickname of the second account belongs to a nickname set of relatives; and the second account and the first account belong to a specified group.

When the second account and the first account satisfy at least one of the foregoing relationships, the server determines that the second account and the first account satisfy the predetermined relationship. In some embodiments, the first account and the second account that satisfy the predetermined relationship may simultaneously satisfy any two relationships, any three relationships, or any four relationships of the foregoing relationships.

In some embodiments, when detecting that the second account and the first account are in a friendship with each other, the server may regard that the second account belongs to the friendship chain of the first account.

In some embodiments, the degree of friendship closeness between the second account and the first account is measured by using an interactive relationship between the first account and the second account. For example, the interactive relationship is a quantity of conversations, a quantity of times of liking, or a quantity of comments on trends between the first account and the second account.

In some embodiments, the preset threshold is set by the user or is a default value.

In some embodiments, the nickname set of relatives includes preset relative title vocabularies, including relative titles such as "mother, father, daughter, and son" and the like.

In some embodiments, a nickname of the second account is an alias nickname corresponding to the second account in the first instant messaging client. In some embodiments, the specified group is one or more groups pre-specified in the first instant messaging client by the first account, and an account in the specified group may have the friendship with the first account, or may not have the friendship with the first account.

For example, that the first account determines the second account in the contact list may be regarded as that the second account belongs to the friendship chain of the first account; alternatively, after the first account obtains, through query, the second account by means of searching for the account, and adds the second account into the specified group, the second account and the first account also satisfy the predetermined relationship.

If finding that the second account and the first account satisfy the predetermined relationship, the server performs step S310; and if finding that the second account and the first account do not satisfy the predetermined relationship, the server does not respond to the authorization request sent by the first instant messaging client the first account is logged into.

In step S310, the server queries for, according to the authorization request, the key information bound to the second account.

The server queries for, according to the second account in the received authorization request, the key information bound to the second account.

In a possible implementation, the server obtains, through query, the fingerprint information bound to the second account.

In step S311, the server queries for a gateway device corresponding to the electronic lock.

Because the sever cannot directly communicate with the electronic lock, to send the key information obtained through query to the electronic lock, the server needs to further query for the gateway device corresponding to the electronic lock, and sends the key information to the electronic lock by using the gateway device.

In some embodiments, one identifier of the electronic lock corresponds to one identifier of the gateway device, and the server stores a correspondence between the lock identifier of the electronic lock and the identifier of the gateway device.

In step S312, the server sends the key information to the electronic lock by using the gateway device.

The key information sent by the server is the key information bound to the second account. In step S313, the electronic lock receives the key information that is sent by the server by using the gateway device and that is of the second account.

In step S314, the electronic lock adds the key information into a trusted key information store.

After receiving the key information sent by the gateway device, the electronic lock adds the key information bound to the second account into the trusted key information store of the electronic lock, and subsequently, the electronic lock identifies a user identity according to the key information stored in the trusted key information store.

In some embodiments, when the electronic lock disconnects from the gateway device, a user that already stores the key information in the trusted key information store of the electronic lock can still open the electronic lock.

By using the foregoing authorization method, when a user to be authorized is away from the electronic lock, the server can still enroll the key information into the electronic lock from a remote end, ensuring authorization to be implemented as normal; further, when a great quantity of users need to be authorized, the manager can implement batch authorization by using the foregoing method, and does not need to collect and enroll the key information for each user to be authorized, thereby improving the authorization efficiency.

Based on the above, in the authorization method applied to an electronic lock according to this embodiment of the present disclosure, the server receives the authorization request sent by the first instant messaging client the first account is logged into, and queries for, according to the authorization request, the key information bound to the second account, so as to send the key information to the electronic lock, and the electronic lock adds the key information into the trusted key information store. The problem that when being away from the electronic lock, the user cannot enroll the key information such as a fingerprint into the electronic lock, and authorization cannot be implemented is resolved. Even being away from the electronic lock, the user can enroll the key information into the electronic lock from a remote end, and the authorization is ensured to be implemented as normal.

Furthermore, in the authorization method applied to an electronic lock according to this embodiment of the present disclosure, whether the first account has the management permission on the electronic lock is further detected, to avoid that the use permission on the electronic lock is randomly changed, thereby ensuring safety of the electronic lock.

Furthermore, in the authorization method applied to an electronic lock according to this embodiment of the present disclosure, whether the second account and the first account satisfy the predetermined relationship is found, and when the second account and the first account satisfy the predetermined relationship, the use permission to the electronic lock is granted to the second account, to avoid that a manager delivers, due to carelessness, the use permission on the electronic lock to a suspicious person, thereby improving the safety of the electronic lock.

Figure 4A:
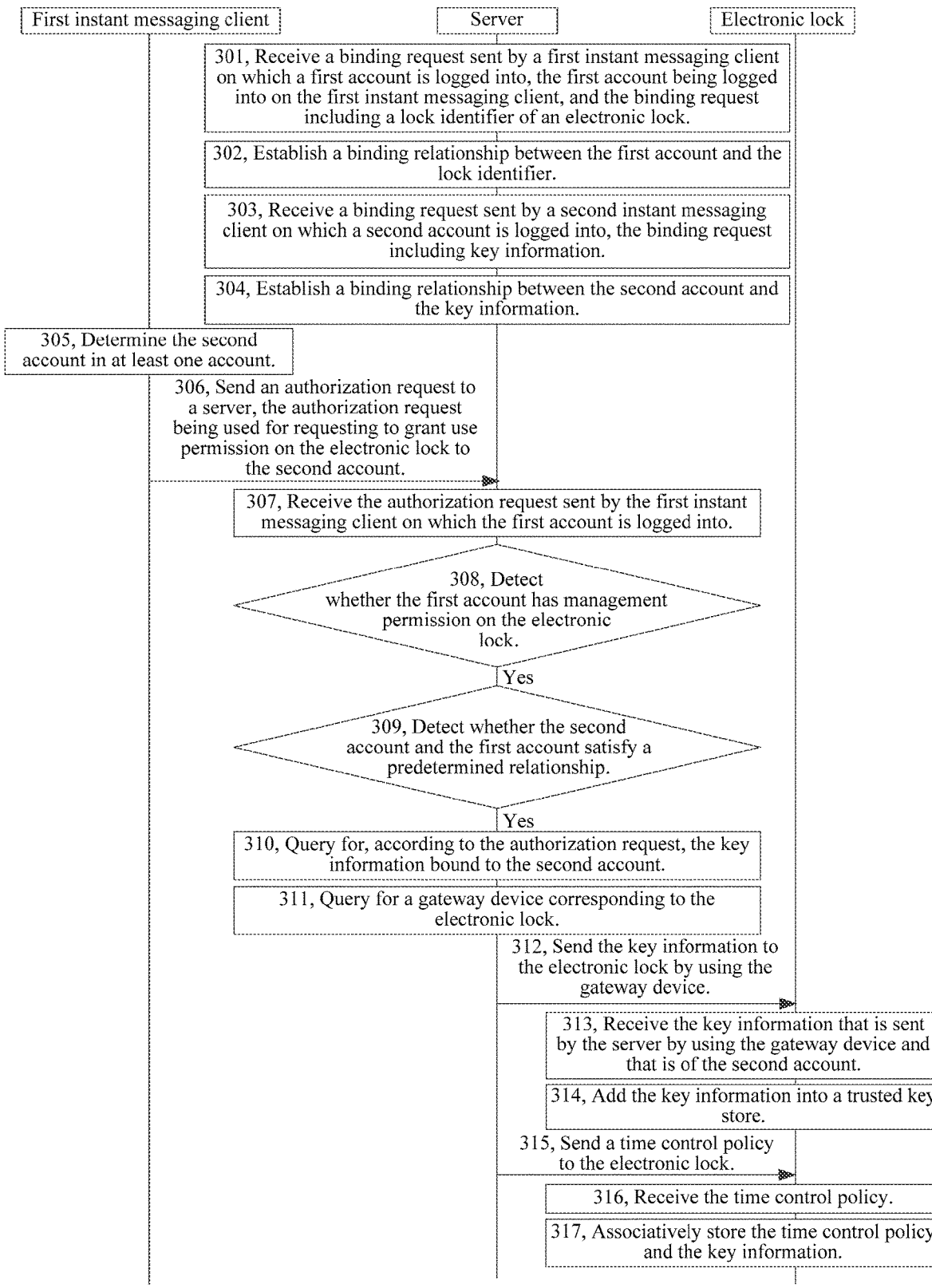
FIG. 4A is a flowchart of an authorization method applied to an electronic lock according to another exemplary embodiment.

In an optional embodiment based on this embodiment shown in FIG. 3A, the authorization request sent by the first instant messaging client the first account is logged into further includes a time control policy corresponding to the use permission. That is, the authorization method applied to an electronic lock further includes step S315, step S316, and step S317, as shown in FIG. 4A.

In step S315, the server sends a time control policy to the electronic lock.

The time control policy is used for instructing to enable the use permission in at least one time period, and the time control policy corresponds to the use permission of the second account.

In some embodiments, the time control policy is set on the first instant messaging client by the first account, and time control policies corresponding to different second accounts may be the same or different. The time control policy may be sent, when the authorization request is sent to the server, by the first instant messaging client the first account is logged into.

In some embodiments, when receiving the authorization request sent by the first instant messaging client the first account is logged into, the server receives the time control policy corresponding to the use permission on the electronic lock, and the server simultaneously sends the key information of the second account and the corresponding time control policy to the electronic lock by using the gateway device.

For example, a user corresponding to the first account uses a fingerprint door lock on a front door of a house of the user, the second account corresponds to an hourly worker of the house of the user, and the hourly worker needs to go to the house of the user corresponding to the first account at 15:00 each day and do the cleaning. The user corresponding to the first account grants, by using the first account, use permission on the fingerprint door lock to the second account corresponding to the hourly worker, and sets the time control policy as that the second account corresponding to the hourly worker can open the fingerprint door lock between 15:00 and 15:10 each day.

It should be noted that this step may be simultaneously performed with step S312. This is not limited in this embodiment.

In step S316, the electronic lock receives the time control policy.

The electronic lock receives the time control policy corresponding to the use permission of the second account.

In some embodiments, when receiving the key information sent by the server, the electronic lock simultaneously receives the corresponding time control policy.

It should be noted that this step may be simultaneously performed with step S313. This is not limited in this embodiment.

In step S317, the electronic lock associatively stores the time control policy and the key information.

After associating the time control policy with the corresponding key information of the second account, the electronic lock stores a correspondence between the time control policy and the key information of the second account Furthermore, in the authorization method applied to an electronic lock according to this embodiment of the present disclosure, the server sends the time control policy to the electronic lock, and the electronic lock associatively stores the time control policy and the key information, so that different key information can open the electronic lock in different time periods, the manager can flexibly and properly control the user permission on the electronic lock, and the safety performance of the electronic lock is improved.

In some embodiments, in the foregoing authorization method applied to an electronic lock, the first account may query for, modify, and delete the use permission on the electronic lock by using the first instant messaging client. That is, the user corresponding to the first account may obtain, through query by using the first instant messaging client, all second accounts to which the use permission on the electronic lock is granted, or obtain, through query, the use permission on the electronic lock of a specific second account, and may also modify or delete the use permission based on a query result.

Figure 4B:
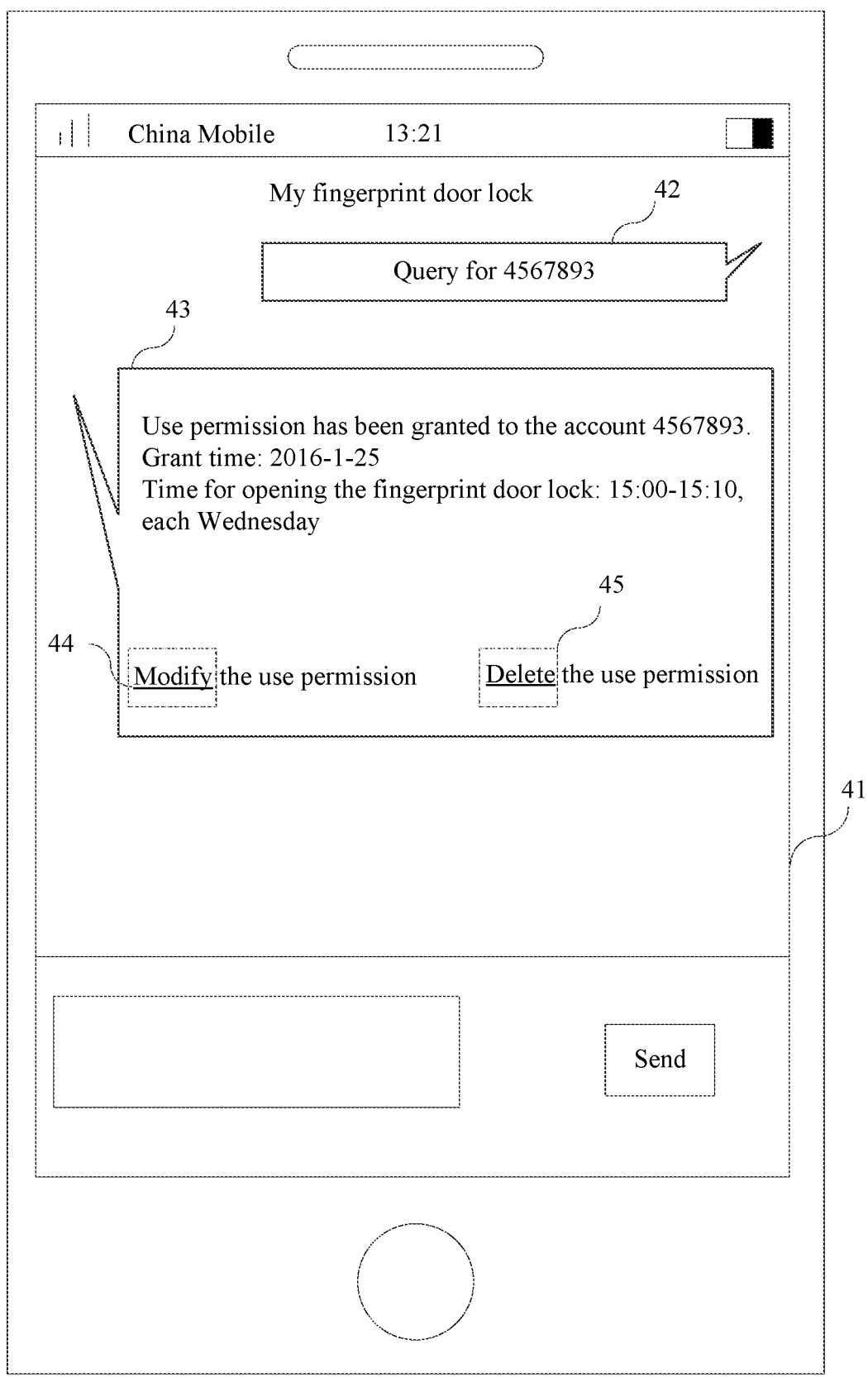
FIG. 4B is a schematic diagram of a message sending interface of instant messaging according to another exemplary embodiment.

For example, as shown in FIG. 4B, the user corresponding to the first account opens a conversation window 41 in the first instant messaging client with the electronic lock bound to the first account, sends a message 42 of "querying for 4567893", and obtains a query result 43 corresponding to a second account "4567893". The query result 43 includes a permission grant status, a grant time point, and a time control policy corresponding to the use permission that are of the second account "4567893". If clicking on a modify option 44, the user can modify the use permission of the second account; and if clicking on a delete option 45, the user deletes the use permission of the second account.

It should be noted that in this foregoing embodiment, a step of which an execution body is the server may be independently performed as an authorization method at a server side, a step of which an execution body is the electronic lock may be independently performed as an authorization method at an electronic lock side, and a step of which an execution body is the instant messaging client may be independently performed as an authorization method at a terminal side. Details are not further described in this embodiment of the present disclosure.

Figure 5:
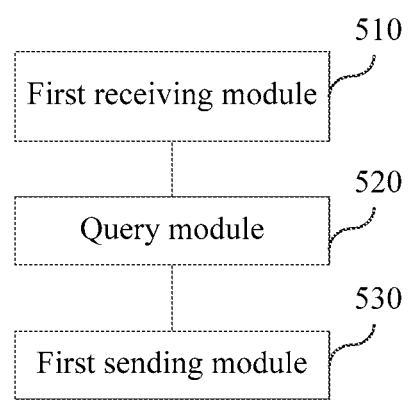
FIG. 5 is a block diagram of an authorization apparatus applied to an electronic lock according to an exemplary embodiment.

Referring to FIG. 5, FIG. 5 is a structural block diagram of an authorization apparatus applied to an electronic lock according to an embodiment of the present disclosure. The authorization apparatus applied to an electronic lock may be achieved, by using software, hardware, or a combination of the software and the hardware, to be all or a part of the server that can provide the authorization method applied to an electronic lock. The apparatus includes:

- a first receiving module 510, configured to receive an authorization request sent by a first instant messaging client at a first terminal, a first account being logged into the first instant messaging client, and the authorization request being used for requesting to grant use permission on the electronic lock to a second account;
- a query module 520, configured to query for, according to the authorization request, key information bound to the second account; and
- a first sending module 530, configured to send the key information to the electronic lock, the electronic lock being configured to add the key information into a trusted key information store.

Based on the above, the authorization apparatus applied to an electronic lock according to this embodiment of the present disclosure receives the authorization request sent by the first instant messaging client the first account is logged into, and queries for, according to the authorization request, the key information bound to the second account, so as to send the key information to the electronic lock, and the electronic lock adds the key information into the trusted key information store. The problem that when being away from the electronic lock, a user cannot enroll the key information such as a fingerprint into the electronic lock, and authorization cannot be implemented is resolved. Even being away from the electronic lock, the user can enroll the key information into the electronic lock from a remote end, and the authorization is ensured to be implemented as normal.

Figure 6:
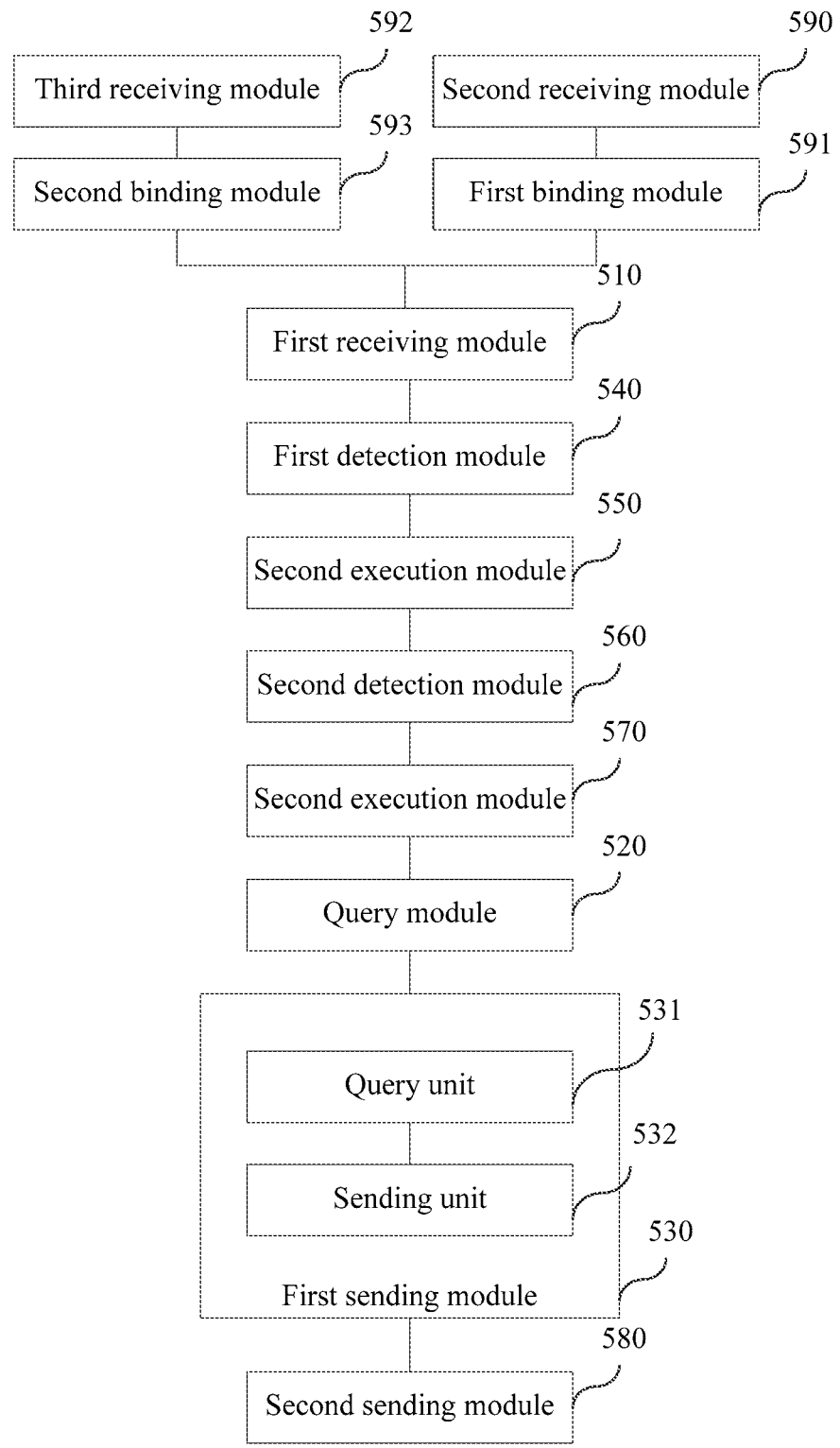
FIG. 6 is a block diagram of an authorization apparatus applied to an electronic lock according to another exemplary embodiment.

Referring to FIG. 6, FIG. 6 is a structural block diagram of an authorization apparatus applied to an electronic lock according to another embodiment of the present disclosure. The authorization apparatus applied to an electronic lock may be achieved, by using software, hardware, or a combination of the software and the hardware, to be all or a part of the server that can provide the authorization method applied to an electronic lock. The apparatus includes:

- a first receiving module 510, configured to receive an authorization request sent by a first instant messaging client at a first terminal, a first account being logged into the first instant messaging client, and the authorization request being used for requesting to grant use permission on the electronic lock to a second account;
- a query module 520, configured to query for, according to the authorization request, key information bound to the second account; and
- a first sending module 530, configured to send the key information to the electronic lock, the electronic lock being configured to add the key information into a trusted key information store.

In some embodiments, the apparatus further includes:
- a first detection module 540, configured to detect whether the first account has management permission on the electronic lock; and
- a second execution module 550, configured to perform, when the first account has the management permission on the electronic lock, the step of querying for, according to the authorization request, key information bound to the second account.

In some embodiments, the apparatus further includes:
- a second detection module 560, configured to detect whether the second account and the first account satisfy a predetermined relationship; and
- a second execution module 570, configured to perform, when the second account and the first account satisfy the predetermined relationship, the step of querying for, according to the authorization request, key information bound to the second account, the predetermined relationship including at least one of the following relationships:
- the second account belongs to a friendship chain of the first account;
- a degree of friendship closeness between the second account and the first account is greater than a preset threshold;
- a nickname of the second account belongs to a nickname set of relatives; and
- the second account and the first account belong to a specified group.

In some embodiments, the first sending module 530 includes:
- a query unit 531, configured to query for a gateway device corresponding to the electronic lock; and
- a sending unit 532, configured to send the key information to the electronic lock by using the gateway device.

In some embodiments, the authorization request further includes a time control policy corresponding to the use permission, and the time control policy is used for instructing to enable the use permission in at least one time period. The apparatus further includes:
- a second sending module 580, configured to send the time control policy to the electronic lock, the electronic lock being configured to associatively store the time control policy and the key information.

In some embodiments, the apparatus further includes:
- a second receiving module 590, configured to receive a binding request sent by a second instant messaging client, the second account being logged into the second instant messaging client, and the binding request including the key information; and
- a first binding module 591, configured to establish a binding relationship between the second account and the key information,
- the key information including: password information, and/or fingerprint information, and/or pupil distance information, and/or iris information, and/or face information, and/or palm print information, and/or gait information, and/or heart rate information, and/or pulse information.

In some embodiments, the apparatus further includes:
- a third receiving module 592, configured to receive a binding request sent by the first instant messaging client, the binding request including a lock identifier of the electronic lock; and
- a second binding module 593, configured to establish a binding relationship between the first account and the lock identifier.

Based on the above, the authorization apparatus applied to an electronic lock according to this embodiment of the present disclosure receives the authorization request sent by the first instant messaging client the first account is logged into, and queries for, according to the authorization request, the key information bound to the second account, so as to send the key information to the electronic lock, and the electronic lock adds the key information into the trusted key information store. The problem that when being away from the electronic lock, a user cannot enroll the key information such as a fingerprint into the electronic lock, and authorization cannot be implemented is resolved. Even being away from the electronic lock, the user can enroll the key information into the electronic lock from a remote end, and the authorization is ensured to be implemented as normal.

Furthermore, the authorization apparatus applied to an electronic lock according to this embodiment of the present disclosure further detects whether the first account has the management permission on the electronic lock, to avoid that the use permission on the electronic lock is randomly changed, thereby ensuring safety of the electronic lock.

Furthermore, the authorization apparatus applied to an electronic lock according to this embodiment of the present disclosure further finds whether the second account and the first account satisfy the predetermined relationship, and when the second account and the first account satisfy the predetermined relationship, grants the use permission to the second account, to avoid that a manager delivers, due to carelessness, the use permission on the electronic lock to a suspicious person, thereby improving the safety of the electronic lock.

Figure 7:
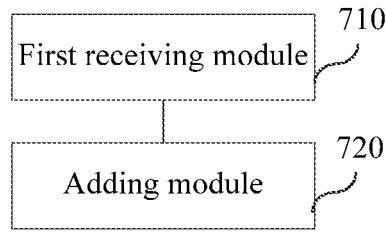
FIG. 7 is a block diagram of an authorization apparatus applied to an electronic lock according to another exemplary embodiment.

Referring to FIG. 7, FIG. 7 is a structural block diagram of an authorization apparatus applied to an electronic lock according to another embodiment of the present disclosure. The authorization apparatus applied to an electronic lock may be achieved, by using software, hardware, or a combination of the software and the hardware, to be all or a part of the electronic lock that can provide the authorization method applied to an electronic lock. The apparatus includes:

- a first receiving module 710, configured to receive key information that is sent by a server and that is of a second account, the key information being obtained by the server through query according to an authorization request sent by a first instant messaging client at a first terminal, a first account being logged into the first instant messaging client, and the authorization request being used for requesting to grant use permission on the electronic lock to the second account; and
- an adding module 720, configured to add the key information into a trusted key information store.

Based on the above, the authorization apparatus applied to an electronic lock according to this embodiment of the present disclosure receives the key information that is sent by the server and that is of the second account, and adds the key information into the trusted key information store. The problem that when being away from the electronic lock, a user cannot enroll the key information such as a fingerprint into the electronic lock, and authorization cannot be implemented is resolved. Even being away from the electronic lock, the user can enroll the key information into the electronic lock from a remote end, and the authorization is ensured to be implemented as normal.

Figure 8:
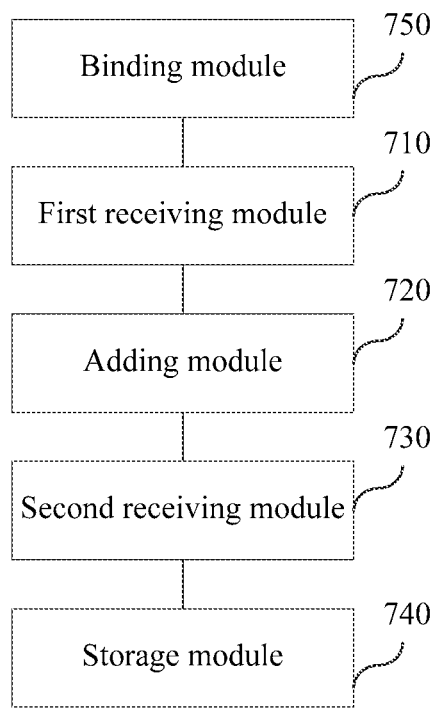
FIG. 8 is a block diagram of an authorization apparatus applied to an electronic lock according to another exemplary embodiment.

Referring to FIG. 8, FIG. 8 is a structural block diagram of an authorization apparatus applied to an electronic lock according to another embodiment of the present disclosure. The authorization apparatus applied to an electronic lock may be achieved, by using software, hardware, or a combination of the software and the hardware, to be all or a part of the electronic lock that can provide the authorization method applied to an electronic lock. The apparatus includes:

- a first receiving module 710, configured to receive key information that is sent by a server and that is of a second account, the key information being obtained by the server through query according to an authorization request sent by a first instant messaging client at a first terminal, a first account being logged into the first instant messaging client, and the authorization request being used for requesting to grant use permission on the electronic lock to the second account; and
- an adding module 720, configured to add the key information into a trusted key information store.

In some embodiments, the first receiving module 710 is specifically configured to receive the key information sent by the server by using a gateway device, there is a correspondence between the gateway device and the electronic lock, and the key information includes: password information, and/or fingerprint information, and/or pupil distance information, and/or iris information, and/or face information, and/or palm print information, and/or gait information, and/or heart rate information, and/or pulse information.

In some embodiments, the authorization request further includes a time control policy corresponding to the use permission, and the apparatus further includes:

- a second receiving module 730, configured to receive the time control policy, the time control policy being used for instructing to enable the use permission in at least one time period; and
- a storage module 740, configured to associatively store the time control policy and the key information.

Based on the above, the authorization apparatus applied to an electronic lock according to this embodiment of the present disclosure receives the key information that is sent by the server and that is of the second account, and adds the key information into the trusted key information store. The problem that when being away from the electronic lock, a user cannot enroll the key information such as a fingerprint into the electronic lock, and authorization cannot be implemented is resolved. Even being away from the electronic lock, the user can enroll the key information into the electronic lock from a remote end, and the authorization is ensured to be implemented as normal.

Furthermore, the authorization apparatus applied to an electronic lock according to this embodiment of the present disclosure further detects whether the first account has the management permission on the electronic lock, to avoid that the use permission on the electronic lock is randomly changed, thereby ensuring safety of the electronic lock.

Furthermore, the authorization apparatus applied to an electronic lock according to this embodiment of the present disclosure further finds whether the second account and the first account satisfy the predetermined relationship, and when the second account and the first account satisfy the predetermined relationship, grants the use permission to the second account, to avoid that a manager delivers, due to carelessness, the use permission on the electronic lock to a suspicious person, thereby improving the safety of the electronic lock.

Figure 9:
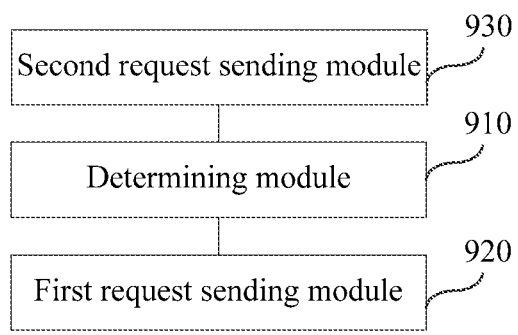
FIG. 9 is a block diagram of an authorization apparatus applied to an electronic lock according to another exemplary embodiment.

Referring to FIG. 9, FIG. 9 is a structural block diagram of an authorization apparatus applied to an electronic lock according to another embodiment of the present disclosure. The authorization apparatus applied to an electronic lock may be achieved, by using software, hardware, or a combination of the software and the hardware, to be all or a part of the terminal that can provide the authorization method applied to an electronic lock. The apparatus includes:

a determining module 910, configured to determine a second account in at least one account; and a first request sending module 920, configured to send an authorization request to a server, the authorization request being used for requesting to grant use permission on the electronic lock to the second account, the server being configured to query for, according to the authorization request, key information bound to the second account, and send the key information to the electronic lock, and the electronic lock being configured to add the key information into a trusted key information store.

Based on the above, the authorization apparatus applied to an electronic lock according to this embodiment of the present disclosure determines the second account in the at least one account, and sends the authorization request to the server, the authorization request being used for requesting to grant the use permission on the electronic lock to the second account, the server being configured to query for, according to the authorization request, the key information bound to the second account, and send the key information to the electronic lock, and the electronic lock being configured to add the key information into the trusted key information store. The problem that when being away from the electronic lock, a user cannot enroll the key information such as a fingerprint into the electronic lock, and authorization cannot be implemented is resolved. Even being away from the electronic lock, the user can enroll the key information into the electronic lock from a remote end, and the authorization is ensured to be implemented as normal In some embodiments, the apparatus further includes:

a second request sending module 930, configured to send a binding request to the server, the binding request including a lock identifier of the electronic lock, and the server being configured to establish a binding relationship between the first account and the lock identifier.

It should be noted that: when the authorization apparatus applied to an electronic lock provided by the foregoing embodiments provides an authorization service for the electronic lock, only division of each functional module is used as an example for description. In practical application, the foregoing functions may be allocated to and completed by different functional modules as required, that is, an inner structure of a device is divided into different functional modules, so as to complete all or some of the functions described above. Besides, the authorization apparatus applied to an electronic lock provided in the foregoing embodiments and the embodiments of the authorization method applied to an electronic lock belong to a same concept. For a specific implementation process, refer to the method embodiments. Details are not described herein again.

Figure 10:
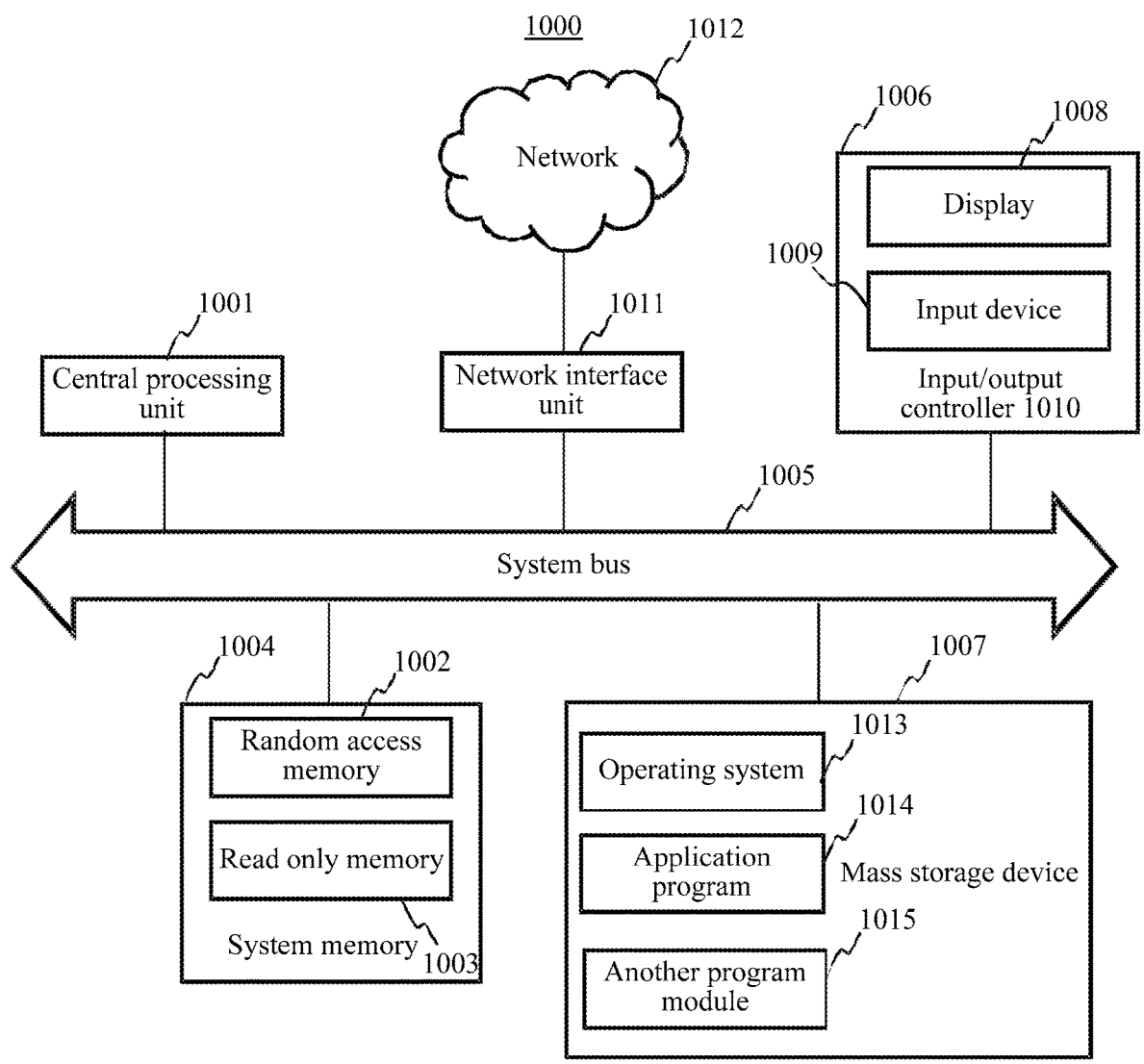
FIG. 10 is a structural block diagram of a server according to an embodiment of the present disclosure.

Referring to FIG. 10, FIG. 10 is a structural block diagram of a server according to an embodiment of the present disclosure. A server 1000 is implemented as the server 130 in FIG. 1. Specifically:

The server 1000 includes a central processing unit (CPU) 1001, a system memory 1004 including a random access memory (RAM) 1002 and a read only memory (ROM) 1003, and a system bus 1005 connecting the system memory 1004 and the CPU 1001. The server 1000 further includes a basic input/output system (I/O system) 1006 used for transmitting information between components in a computer, and a mass storage device 1007 used for storing an operating system 1013, an application program 1014, and another program module 1015.

The basic I/O system 1006 includes a display 1008 configured to display information, and an input device 1009, such as a mouse or a keyboard, configured to input information by a user. The display 1008 and the input device 1009 are both connected to the CPU 1001 by using an input and output controller 1010 connected to the system bus 1005. The basic I/O system 1006 may further include the input and output controller 1010, so as to receive and process input from multiple other devices such as a keyboard, a mouse, and an electronic stylus. Similarly, the input and output controller 1010 further provides an output to a display screen, a printer or another type of output device.

The mass storage device 1007 is connected to the CPU 1001 by using a mass storage controller (not shown) connected to the system bus 1005. The mass storage device 1007 and an associated non-transitory computer readable storage medium provide non-volatile storage to the server 1000. That is, the mass storage device 1007 may include a computer readable storage medium (not shown) such as a hard disk or a CD-ROM drive.

In general, the computer readable storage medium may include a communications medium. The computer readable storage medium includes volatile and non-volatile media, and removable and non-removable media implemented by using any method or technology used for storing information such as a computer readable instruction, a data structure, a program module or other data. The computer readable storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, a person in the art may know that the computer readable storage medium is not limited to the foregoing. The system memory 1004 and the mass storage device 1007 may be collectively referred to as a memory.

According to the embodiments of the present disclosure, the server 1000 may further be connected to a remote computer on a network by using a network, such as Internet. That is, the server 1000 may be connected to a network 1012 by using a network interface unit 1011 connected to the system bus 1005, or, may be connected to a network of another type or a remote computer system (not shown) by using the network interface unit 1011.

The memory further includes one or more programs, the one or more programs are stored in the memory, and the one or more programs include instructions used for performing the authorization method at a server side according to the embodiments of the present disclosure.

Figure 11:
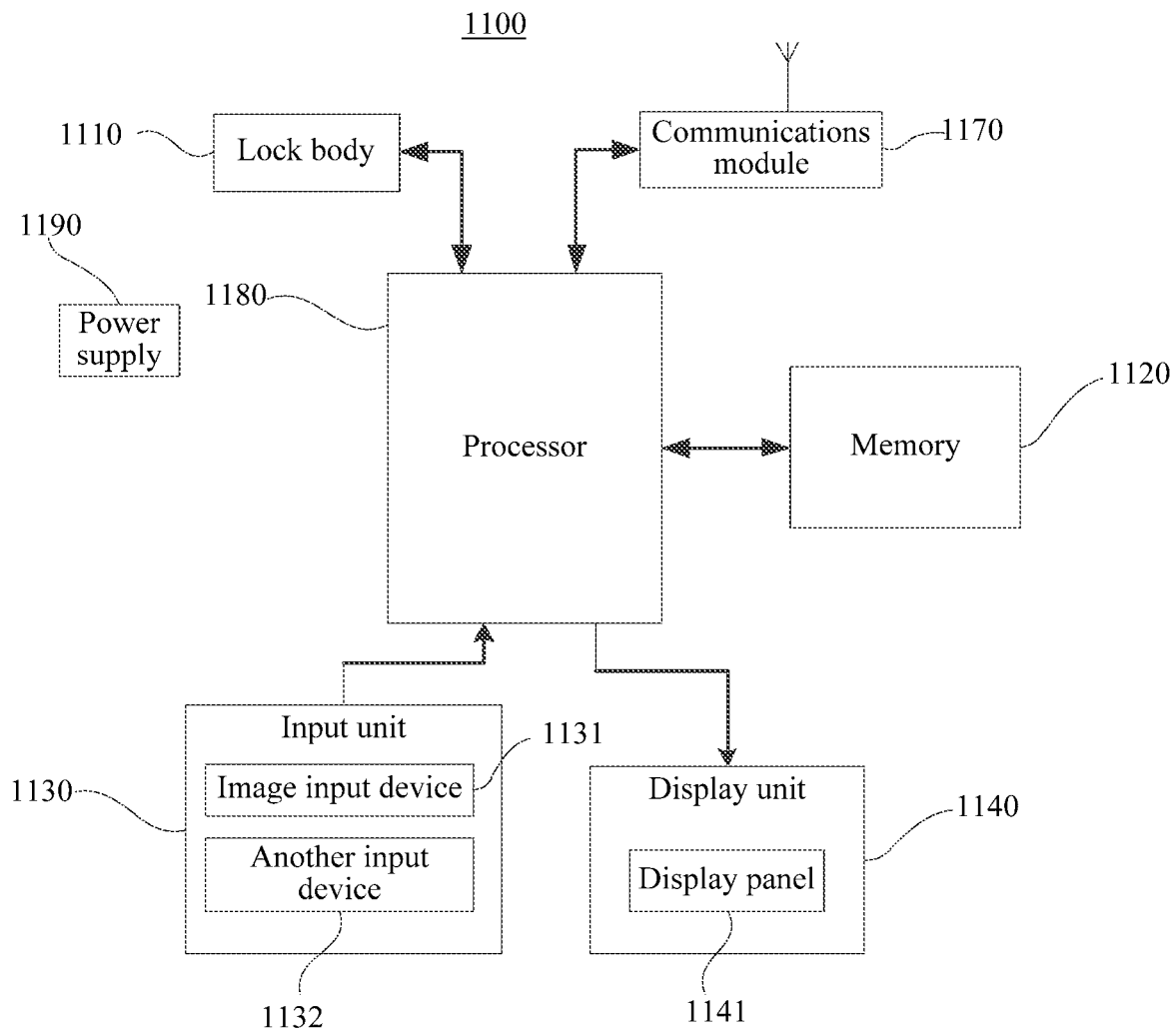
FIG. 11 is a structural block diagram of an electronic lock according to an embodiment of the present disclosure.

Referring to FIG. 11, FIG. 11 is a schematic structural diagram of an electronic lock according to an embodiment of the present disclosure. The electronic lock may be configured to implement the authorization method according to the foregoing embodiments. Specifically:

An electronic lock 1100 may include a lock body 1110, a memory 1120 having one or more computer readable storage media, an input unit 1130, a display unit 1140, a transmission unit 1170, a processor 1180 including one or more processor cores, a power supply 1190, and other components. A person skilled in the art may understand that the structure of the lock shown in FIG. 11 does not constitute a limitation to the electronic lock, and the electronic may include more or fewer components than those shown in the figure, or some components may be combined, or a different component deployment may be used.

The lock body 1110 is a one-way lock body, a three-way lock body, a four-way lock body, or the like, and the lock body 1110 is in an open state or a closed state under control of the processor 1118.

The memory 1120 may be configured to store a software program and module. The processor 1180 runs the software program and module stored in the memory 1120, to implement various functional applications and data processing. The memory 1120 may mainly include a program storage area and a data storage area. The program storage area may store an application program required by at least one function, and the data storage area may store enrolled key information and corresponding use permission information. In addition, the memory 1120 may include a high speed random access memory, and may also include a non-volatile memory, such as at least one magnetic disk storage device, a flash memory, or another volatile solid-state storage device. Correspondingly, the memory 1120 may further include a memory controller, so as to provide access of the processor 1180 and the input unit 1130 to the memory 1120.

The input unit 1130 is configured to receive key information input by a user. The input unit 1130 may include a touch-sensitive surface 1131 and another input device 1132. The touch-sensitive surface 1131, which may also be referred to as a touch display screen or a touch control board, may collect a touch operation of a user on or near the touch-sensitive surface 1131 (such as an operation of the user on or near the touch-sensitive surface 1131 by using any suitable object or accessory, such as a finger or a stylus), and drive a corresponding connection apparatus according to a preset program. In some embodiments, the touch-sensitive surface 1131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1180. Moreover, the touch controller can receive and execute a command sent from the processor 1180. In addition, the touch-sensitive surface 1131 may be a resistive, capacitive, infrared, or surface sound wave type touch-sensitive surface. In addition to the touch-sensitive surface 1131, the input unit 1130 may further include another input device 1132. Specifically, the input device 1132 may include but is not limited to one or more of a fingerprint collector, a palm print collector, an iris collector, and a heart rate collector.

The display unit 1140 may be configured to display information input by the user or information provided for the user, and various graphical user interfaces of the electronic lock 1100. The graphical user interfaces may be formed by a graph, text, an icon, a video, or any combination thereof. The display unit 1140 may include a display panel 1141. In some embodiments, the display panel 1141 may be configured by using a liquid crystal display (LCD), an organic light-emitting diode (OLED), or the like. Further, the touch-sensitive surface 1131 may cover the display panel 1141. After detecting a touch operation on or near the touch-sensitive surface 1131, the touch-sensitive surface 1131 transfers the touch operation to the processor 1180, so as to determine the type of the touch event. Then, the processor 1180 provides a corresponding visual output on the display panel 1141 according to the type of the touch event. Although, in FIG. 11, the touch-sensitive surface 1131 and the display panel 1141 are used as two separate parts to implement input and output functions, in some embodiments, the touch-sensitive surface 1131 and the display panel 1141 may be integrated to implement the input and output functions.

In this embodiment, the electronic lock 1100 performs data transmission with a gateway device by using a communications module 1170. The communications module 1170 is a low-power near field communications module, such as a Bluetooth module or a Zigbee module.

The processor 1180 is a control center of the electronic lock 1100, is connected to various parts of a mobile phone by using various interfaces and lines, and by means of running or executing a software program and/or module stored in the memory 1120, performs various functions of the electronic lock 1100 and processes data, so as to perform overall monitoring. In some embodiments, the processor 1180 may include one or more processor cores. Preferably, the processor 1180 may integrate an application processor and a modem. The application processor mainly processes an operating system, a user interface, an application program, and the like. The modem mainly processes wireless communication. It may be understood that the modem may also not be integrated into the processor 1180.

The electronic lock 1100 further includes the power supply 1190 (such as a battery) supplying power to the components. Preferably, the power supply may be logically connected to the processor 1180 by using a power supply management system, so as to implement functions such as management of charging, discharging, and energy consumption by using the power supply management system. The power supply 1190 may further include one or more of a direct current or alternating current power supply, a re-charging system, a power supply failure detection circuit, a power supply converter or inverter, a power supply state indicator, and any other components.

Although not shown in the figure, the electronic lock 1100 may further include a camera, and other components. Details are not further described herein. Specifically, in this embodiment, the input unit of the electronic lock 1100 is a fingerprint collector, and the display unit is a touch screen display. The electronic lock 1100 further includes a memory and one or more programs. The one or more programs are stored in the memory and configured to be executed by one or more processors. The one or more programs include instructions used for executing operations in the foregoing authorization method.

In an exemplary embodiment, a non-transitory computer readable storage medium including instructions is further provided, for example, a memory including instructions, and the foregoing instructions may be executed by a processor in a server or an electronic lock to implement the authorization method shown in the embodiment of FIG. 2A, the embodiment of FIG. 3A, or the embodiment of FIG. 4A. For example, the non-transitory computer readable storage medium may be a ROM, a RAM, a CD-ROM, a magnetic tape, a floppy disk, or an optical data storage device.

Figure 12:
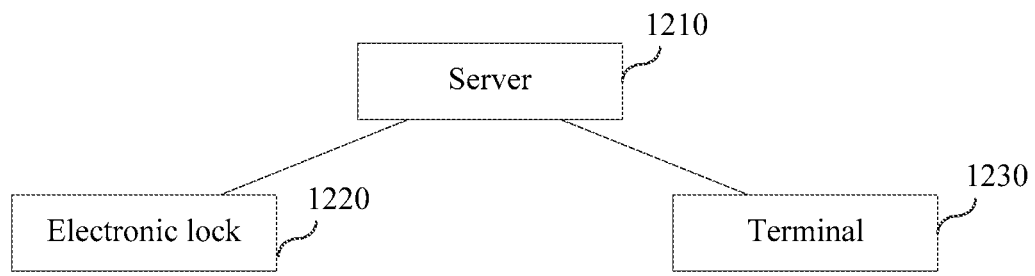
FIG. 12 is a block diagram of an authorization system applied to an electronic lock according to an exemplary embodiment.

Referring to FIG. 12, FIG. 12 is a structural block diagram of an authorization system applied to an electronic lock according to an embodiment of the present disclosure. The authorization system applied to an electronic lock includes: a server 1210, an electronic lock 1220, and a terminal 1230.

The server 1210 includes the apparatus shown in FIG. 4 or FIG. 5;

the electronic lock 1220 includes the apparatus shown in FIG. 6 or FIG. 7; and the terminal 1230 includes the apparatus shown in FIG. 8;

or the server 1210 includes the server shown in FIG. 10; and the electronic lock 1220 includes the electronic lock shown in FIG. 11.

The sequence numbers of the foregoing embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a non-transitory computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An authorization method performed at a computer server hosting an instant messaging application, the server having one or more processors and memory storing instructions to be executed by the one or more processors, the method comprising:
   receiving a first binding request sent by a first terminal, wherein the first terminal is associated with a first user having a first account of the instant messaging application, and wherein the first binding request includes a lock identifier of an electronic lock;
   establishing a first binding relationship between the first account and the lock identifier;
   receiving a second binding request sent by a second terminal, wherein the second terminal is associated with a second user having a second account of the instant messaging application, the second binding request including fingerprint information corresponding to second user, wherein the fingerprint information is collected by the second terminal using the instant messaging application;
   establishing a second binding relationship between the second account and the fingerprint information;
   receiving an authorization request sent by the first terminal, wherein the authorization request is a request to grant use permission on the electronic lock to the second account;
   in accordance with the authorization request:
      determining that the first account and the second account have a chat session on the instant messaging application;
      in accordance with a determination that the first account and the second account satisfy a predetermined relationship, querying for the fingerprint information bound to the second account; and
      sending the fingerprint information to the electronic lock, wherein the electronic lock is configured to add the fingerprint information into a trusted key information store.

2. The method according to claim 1, further comprising:
   before the querying, detecting whether the first account has management permission on the electronic lock; and
   wherein the querying is performed in accordance with a determination that the first account has the management permission on the electronic lock.

3. The method according to claim 1, further comprising detecting whether the second account and the first account satisfy the predetermined relationship, wherein the predetermined relationship comprises at least one of the following relationships:
   the second account belongs to a friendship chain of the first account;
   a degree of friendship closeness between the second account and the first account is greater than a preset threshold;
   a nickname of the second account belongs to a nickname set of relatives; and
   the second account and the first account belong to a specified group.

4. The method according to claim 1, wherein the sending the fingerprint information to the electronic lock comprises:
   querying for a gateway device corresponding to the electronic lock; and
   sending the fingerprint information to the electronic lock by using the gateway device.

5. The method according to claim 1, wherein the authorization request further comprises a time control policy corresponding to the use permission, and the time control policy is used for instructing to enable the use permission in at least one time period; and
   the method further comprises:
   sending the time control policy to the electronic lock, wherein the electronic lock is configured to associatively store the time control policy and the fingerprint information.

6. The method according to claim 1, further comprising:
   receiving a verification request sent by the electronic lock, the verification request including a user account logged into an instant messaging client associated with the electronic lock and fingerprint information;
   identifying one or more user accounts that have been granted user permission to the electronic lock according to the user account logged into an instant messaging client associated with the electronic lock and their associated fingerprint information; and
   returning a verification response to the electronic lock based on a comparison of the fingerprint information in the verification request and the fingerprint information associated with the identified one or more user accounts, wherein the electronic lock is configured to perform in accordance with the verification response.

7. The method according to claim 6, wherein the comparison of the fingerprint information in the verification request and the fingerprint information associated with the identified one or more user accounts further comprises:
   determining the second account logged into the instant messaging application at the second terminal according to the fingerprint information in the verification request;
   determining a current location of the second terminal; and
   denying the verification request in accordance with a determination that the current location of the second terminal is outside a predefined region of the electronic lock.

8. A computer server hosting an instant messaging application, comprising:
   one or more processors;
   memory; and
   a plurality of instructions stored in the memory that, when executed by the one or more processors, cause the computer server to perform the following operations:
      receiving a first binding request sent by a first terminal, wherein the first terminal is associated with a first user having a first account of the instant messaging application, and wherein the first binding request includes a lock identifier of an electronic lock:

establishing a first binding relationship between the first account and the lock identifier:

receiving a second binding request sent by a second terminal, wherein the second terminal is associated with a second user having a second account of the instant messaging application, the second binding request including fingerprint information corresponding to second user, wherein the fingerprint information is collected by the second terminal using the instant messaging application;

establishing a second binding relationship between the second account and the fingerprint information;

receiving an authorization request sent by the first terminal, wherein the authorization request is a request to grant use permission on the electronic lock to the second account;

in accordance with the authorization request:
  determining that the first account and the second account have a chat session on the instant messaging application;
  in accordance with a determination that the first account and the second account satisfy a predetermined relationship, querying for the fingerprint information bound to the second account; and
  sending the fingerprint information to the electronic lock, wherein the electronic lock is configured to add the fingerprint information into a trusted key information store.

9. The computer server according to claim 8, further comprising:
  before the querying, detecting whether the first account has management permission on the electronic lock; and
  wherein the querying is performed in accordance with a determination that the first account has the management permission on the electronic lock.

10. The computer server according to claim 8, further comprising:
  detecting whether the second account and the first account satisfy the predetermined relationship wherein
  the predetermined relationship comprises at least one of the following relationships:
    the second account belongs to a friendship chain of the first account;
    a degree of friendship closeness between the second account and the first account is greater than a preset threshold;
    a nickname of the second account belongs to a nickname set of relatives; and
    the second account and the first account belong to a specified group.

11. The computer server according to claim 8, wherein the sending the fingerprint information to the electronic lock comprises:
  querying for a gateway device corresponding to the electronic lock; and
  sending the fingerprint information to the electronic lock by using the gateway device.

12. The computer server according to claim 8, wherein the authorization request further comprises a time control policy corresponding to the use permission, and the time control policy is used for instructing to enable the use permission in at least one time period; and the operations further comprise:

sending the time control policy to the electronic lock, wherein the electronic lock is configured to associatively store the time control policy and the fingerprint information.

13. The computer server according to claim 8, wherein the operations further comprise:
  receiving a verification request sent by the electronic lock, the verification request including a user account logged into an instant messaging client associated with the electronic lock and fingerprint information;
  identifying one or more user accounts that have been granted user permission to the electronic lock according to the user account logged into an instant messaging client associated with the electronic lock and their associated fingerprint information; and
  returning a verification response to the electronic lock based on a comparison of the fingerprint information in the verification request and the fingerprint information associated with the identified one or more user accounts, wherein the electronic lock is configured to perform in accordance with the verification response.

14. The computer server according to claim 13, wherein the comparison of the fingerprint information in the verification request and the fingerprint information associated with the identified one or more user accounts further comprises:
  determining the second account logged into the instant messaging application at the second terminal according to the fingerprint information in the verification request;
  determining a current location of the second terminal; and
  denying the verification request in accordance with a determination that the current location of the second terminal is outside a predefined region of the electronic lock.

15. A non-transitory computer readable storage medium storing a plurality of instructions configured for execution by a computer server hosting an instant messaging application, the computer server having one or more processors, the plurality of instructions causing the computer server to perform the following operations:
  receiving a first binding request sent by a first terminal, wherein the first terminal is associated with a first user having a first account of the instant messaging application, and wherein the first binding request includes a lock identifier of an electronic lock;
  establishing a first binding relationship between the first account and the lock identifier;
  receiving a second binding request sent by a second terminal, wherein the second terminal is associated with a second user having a second account of the instant messaging application, the second binding request including fingerprint information corresponding to second user, wherein the fingerprint information is collected by the second terminal using the instant messaging application;
  establishing a second binding relationship between the second account and the fingerprint information;
  receiving an authorization request sent by the first terminal, wherein the authorization request is a request to grant use permission on the electronic lock to the second account;
  in accordance with the authorization request:
    determining that the first account and the second account have a chat session on the instant messaging application;

in accordance with a determination that the first account and the second account satisfy a predetermined relationship, querying for the fingerprint information bound to the second account; and sending the fingerprint information to the electronic lock, wherein the electronic lock is configured to add the fingerprint information into a trusted key information store.

16. The non-transitory computer readable storage medium according to claim 15, wherein the operations further comprise:

receiving a verification request sent by the electronic lock, the verification request including a user account logged into an instant messaging client associated with the electronic lock and fingerprint information;

identifying one or more user accounts that have been granted user permission to the electronic lock according to the user account logged into an instant messaging client associated with the electronic lock and their associated fingerprint information; and returning a verification response to the electronic lock based on a comparison of the fingerprint information in the verification request and the fingerprint information associated with the identified one or more user accounts, wherein the electronic lock is configured to perform in accordance with the verification response.

* * * * *